United States Patent [19]

Lamarche

[11] Patent Number: 4,702,721
[45] Date of Patent: Oct. 27, 1987

[54] LONG TRAVEL DAMPER WITH LOW LAG DYNAMIC SPRING RETAINERS

[75] Inventor: Paul E. Lamarche, Utica, Mich.

[73] Assignee: Borg-Warner Automotive, Inc., Troy, Mich.

[21] Appl. No.: 841,122

[22] Filed: Mar. 18, 1986

[51] Int. Cl.⁴ .............................................. F16D 3/14
[52] U.S. Cl. .................... 464/67; 192/106.2; 464/66
[58] Field of Search .................. 192/3.28, 3.29, 106.2; 464/63, 64, 66, 67, 68

[56] References Cited

U.S. PATENT DOCUMENTS

| | | | |
|---|---|---|---|
| 799,388 | 9/1905 | Keyes | 464/63 |
| 852,883 | 5/1907 | Keyes | 464/63 |
| 1,627,964 | 5/1927 | Galloway | 464/63 |
| 2,149,887 | 3/1939 | Hickman | 464/64 X |
| 2,574,573 | 11/1951 | Libby | 464/68 |
| 2,632,318 | 3/1953 | Meyer | 464/66 |
| 4,304,107 | 12/1981 | Fall et al. | 192/106.2 X |
| 4,347,717 | 9/1982 | Lamarche | 464/64 |
| 4,360,352 | 11/1982 | Lamarche | 464/64 |
| 4,441,594 | 4/1984 | Kubo et al. | 192/106.2 X |
| 4,441,595 | 4/1984 | Lamarche | 192/3.29 |
| 4,484,898 | 11/1984 | Kohno | 464/64 |
| 4,493,674 | 1/1985 | Tamura et al. | 464/68 |
| 4,530,673 | 7/1985 | Lamarche | 464/64 |
| 4,572,339 | 2/1986 | Koshimo | 192/106.2 X |

FOREIGN PATENT DOCUMENTS

| | | | |
|---|---|---|---|
| 1032601 | 6/1958 | Fed. Rep. of Germany | 464/67 |
| 2742524 | 3/1978 | Fed. Rep. of Germany | 192/106.2 |
| 77923 | 5/1983 | Japan . | |
| 106247 | 6/1983 | Japan | 192/106.2 |
| 109723 | 6/1983 | Japan . | |
| 112739 | 8/1983 | Japan . | |
| 200822 | 11/1983 | Japan . | |

Primary Examiner—Daniel P. Stodola
Attorney, Agent, or Firm—James A. Geppert

[57] ABSTRACT

A long travel damper assembly operatively connecting torque input and output members including a piston plate acting as a clutch plate for torque input from a vehicle engine, a hub connected to a transmission input shaft and comprising a generally flat annular plate with circumferentially spaced radial arms extending outwardly from the flange, a plurality of elongated arcuate slots formed in the hub plate, and generally wedge-shaped individual spring separators or skates having rollers positioned at their inner ends riding in the arcuate slots. A plurality of generally U-shaped torque input members are secured to the piston plate and encompass the hub arms between compression springs to act as driving elements. As an alternative, the spring separators comprise annular generally concentric rings having radial arms interposed between damper springs.

13 Claims, 15 Drawing Figures

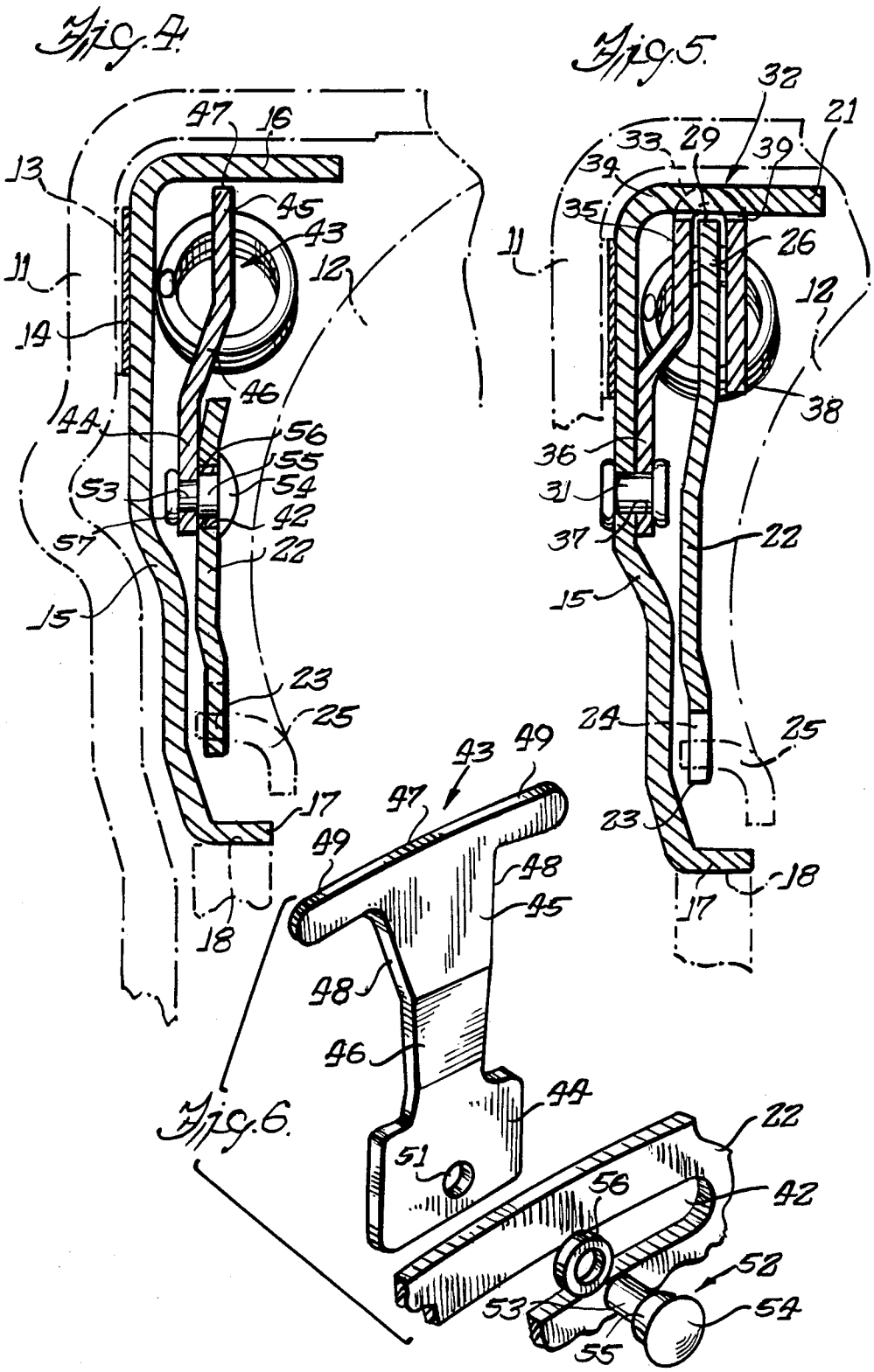

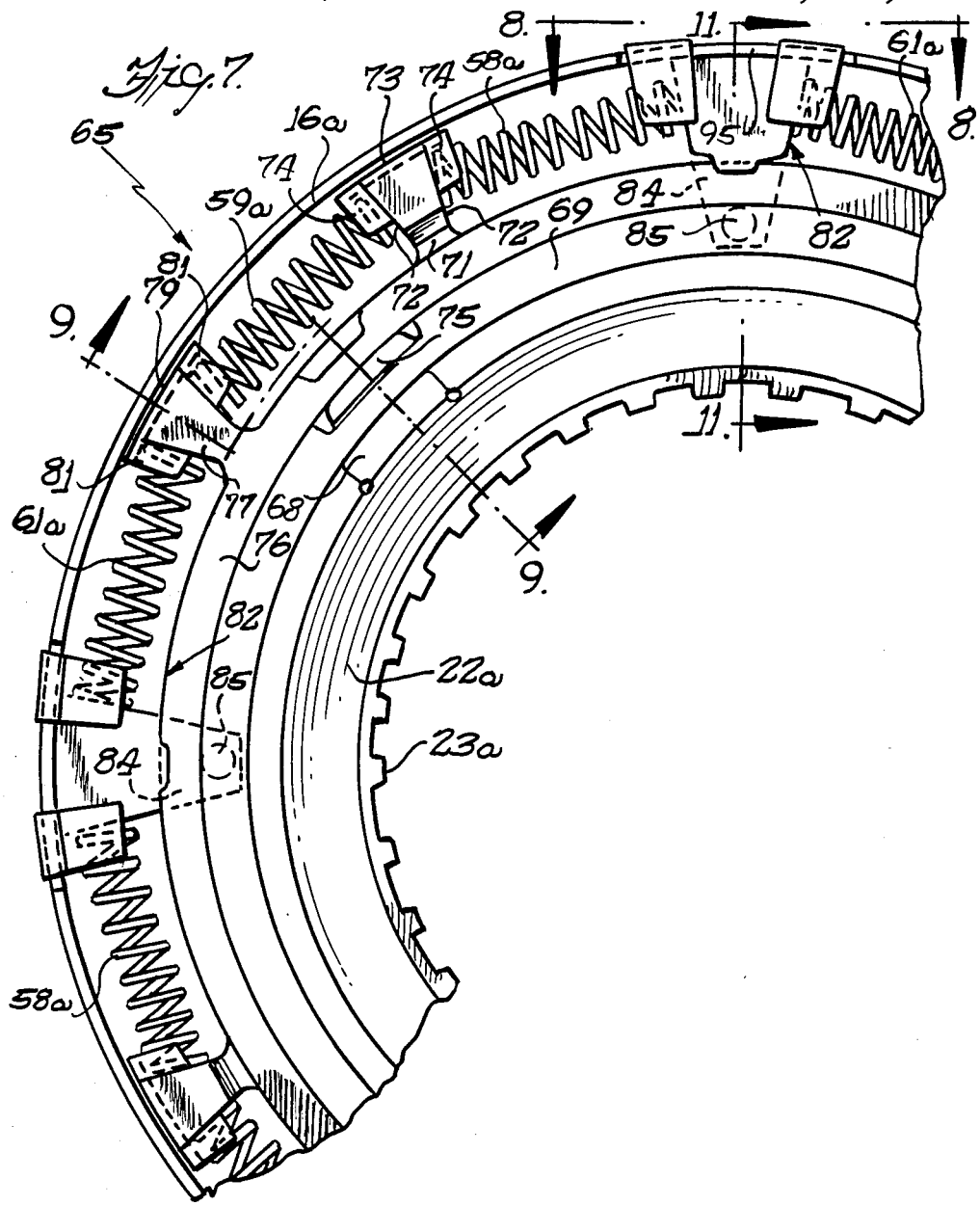
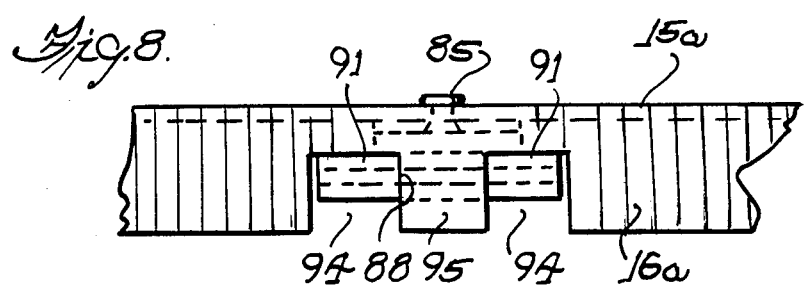

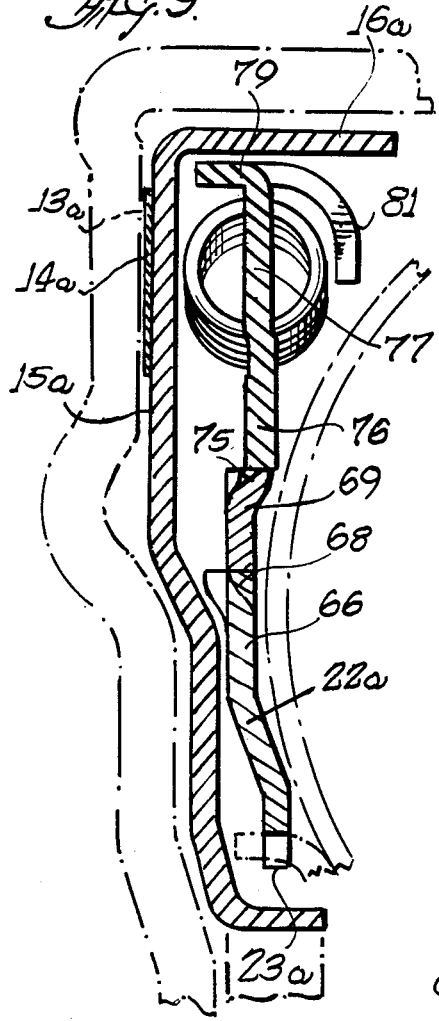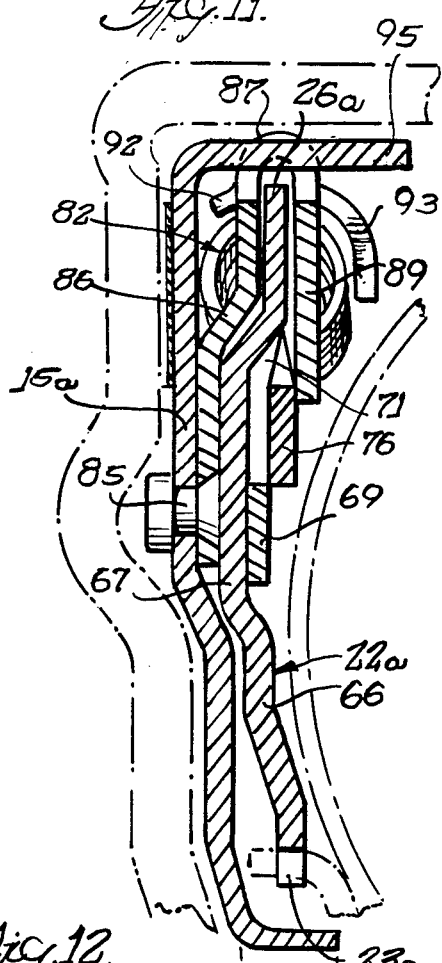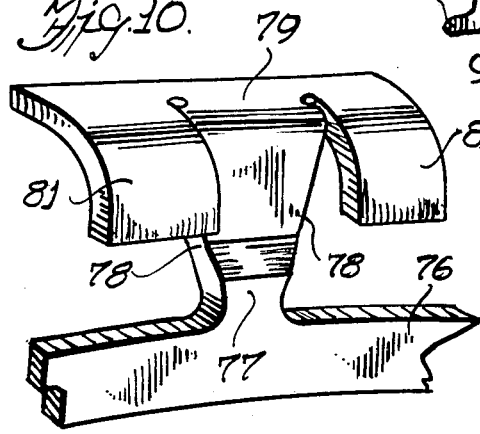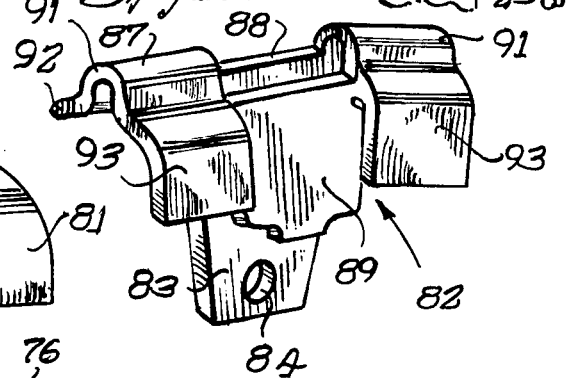

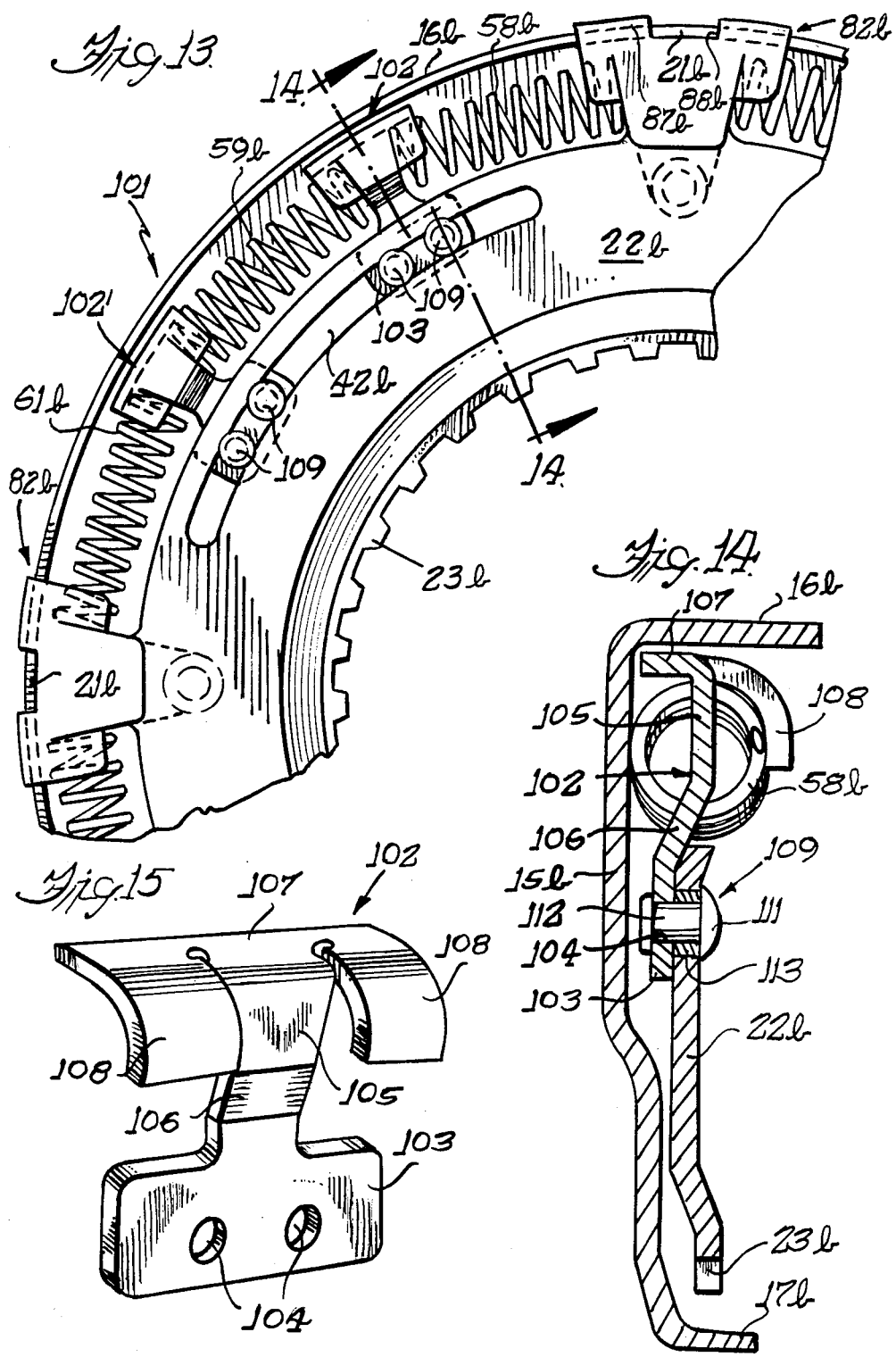

LONG TRAVEL DAMPER WITH LOW LAG DYNAMIC SPRING RETAINERS

BACKGROUND OF THE DISCLOSURE

It is well known to use a combination spring and friction type vibration damper in a conventional vehicle clutch ahead of a manual transmission for the purpose of neutralizing any torsional vibrations emanating from the vehicle engine which would otherwise cause undesirable characteristics, e.g. impact loads, pulsations, noises, etc. in the transmission and driveline during operation of the vehicle.

With an automatic transmission including a hydraulic torque converter positioned between the vehicle engine and the transmission, the torsional vibrations are hydraulically dampened in the torque converter, obviating the need for a vibration damper. However, with the addition of a lock-up clutch in the torque converter to enhance the efficiency of the transmission by providing a direct connection between the engine and the transmission at higher vehicle speeds, vibrations again arise as a problem requiring a vibration damper in the lock-up clutch assembly.

Previous vibration damper assemblies have not been effective in the torque converter lock-up clutch due to the limited travel before the damper springs bottom out. A number of patents have recently issued to applicant providing an extended range of travel in the damper assembly to provide adequate damping for torsional vibrations present in the newer engine-automatic transmission combinations. The present invention provides another effective vibration damper assembly for use in manual clutches or torque converter lock-up clutch assemblies where low hysteresis is desired in a series spring coupling.

SUMMARY OF THE INVENTION

The present invention relates to a low hysteresis long travel vibration damper of a streamlined and compact design adapted to fit within the limited space between the turbine of a torque converter and the converter housing containing a friction surface which cooperates with a friction surface on a piston plate for the clutch and damper assembly. The damper assembly includes an annular piston plate axially slidable on a hub portion of the converter housing, a hub plate which generally parallels the piston plate and is connected to the turbine hub, two or more radial arms circumferentially spaced on the hub plate, one or more annular floating equalizers having arms located in substantially the same plane as the hub arms, a plurality of torque input members secured to the piston plate and generally axially aligned with the hub arms, and damper springs between the hub arms and equalizer arms.

The present invention also relates to a long travel vibration damper for a torque converter lock-up clutch wherein a hub plate has a plurality of circumferentially equally spaced radial hub arms and elongated arcuate slots in the plate between the adjacent arms; a slot being provided for one or more spring separators, and torque input members secured to a piston plate and axially aligned with each hub arm. Each equalizer includes a base having one or more rollers received in an arcuate slot in the hub plate and a radial arm with diverging edges terminating in circumferentially extending arms moving within the piston plate. The torque input members and the equalizers now have curved outer wing-like surfaces acting as a partial housing for the damper springs between the hub arms and equalizer arms.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 4 is an enlarged partial cross sectional view taken on the line 4—4 of FIG. 2.

FIG. 5 is an enlarged partial cross sectional view taken on the line 5—5 of FIG. 2.

FIG. 6 is an enlarged exploded perspective view of a spring divider and mounting in the hub plate.

FIG. 7 is a partial rear elevational view of a second embodiment of vibration damper assembly.

FIG. 8 is an enlarged partial top elevational view taken on the line 8—8 of FIG. 7.

FIG. 9 is an enlarged partial cross sectional view taken on the irregular line 9—9 of FIG. 7.

FIG. 10 is an enlarged perspective view of an equalizer arm shown in cross section in FIG. 9.

FIG. 11 is an enlarged partial cross sectional view taken on the line 11—11 of FIG. 7.

FIG. 12 is an enlarged perspective view of a torque input member shown in cross section in FIG. 11.

FIG. 13 is a partial rear elevational view of a third embodiment of vibration damper assembly.

FIG. 14 is an enlarged partial cross sectional view taken on the irregular line 14—14 of FIG. 13.

FIG. 15 is an enlarged perspective view of an equalizer shown in FIGS. 13 and 14.

DESCRIPTION OF THE PREFERRED EMBODIMENTS

Figure 1:
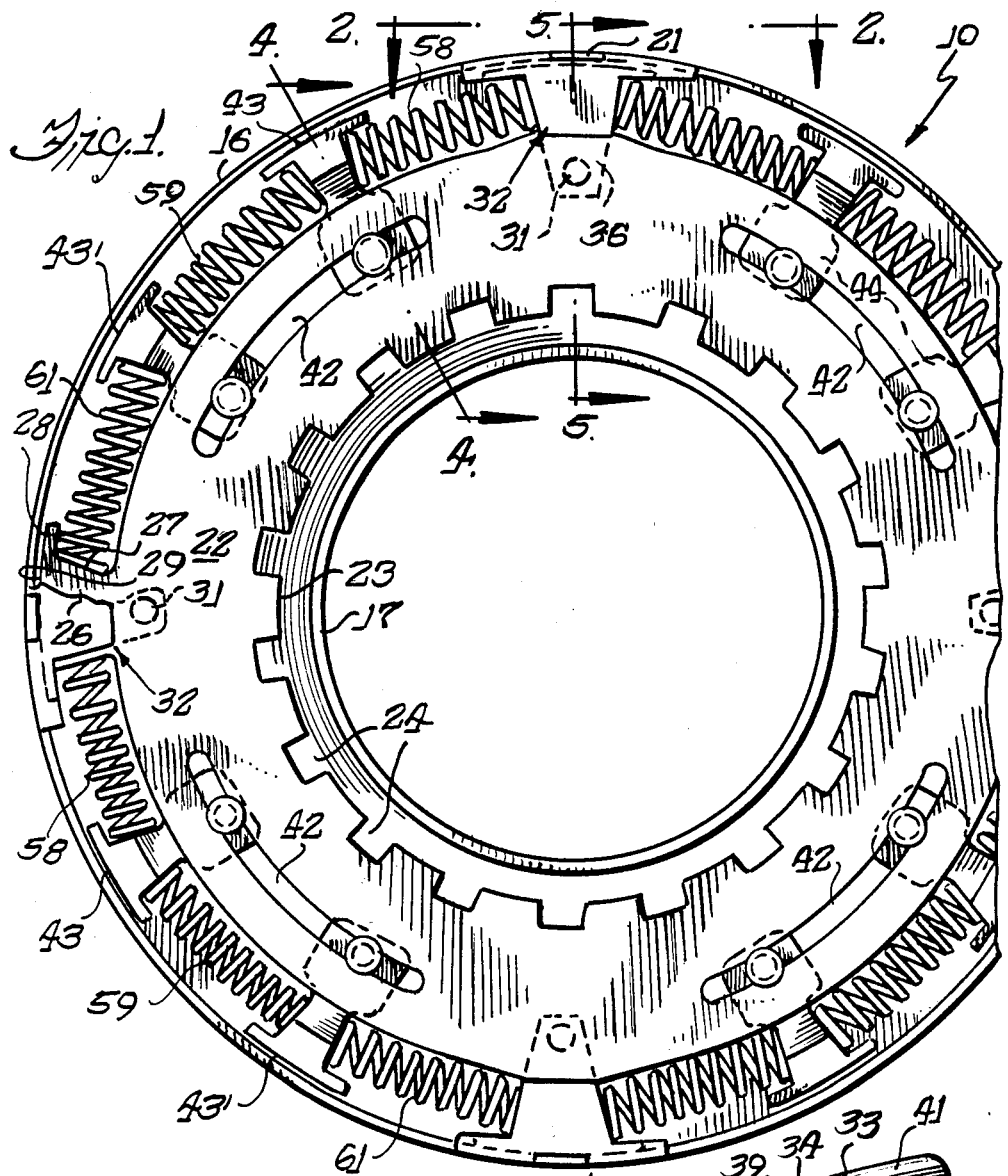
FIG. 1 is a rear elevational view, with portions broken away, of a long travel damper assembly of the present invention.
Figure 2:
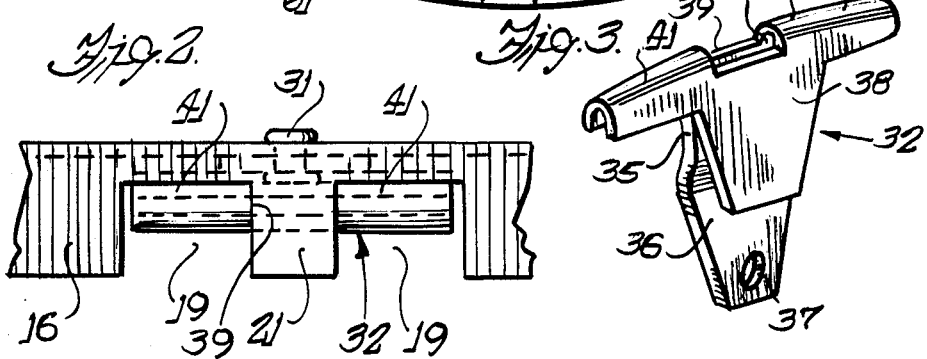
FIG. 2 is an enlarged partial top elevational view taken on the line 2—2 of FIG. 1.

Referring more particularly to the disclosure in the drawings wherein are shown illustrative embodiments of the present invention, FIGS. 1 through 6 disclose a vibration damper assembly 10 utilized in the limited space between a torque converter housing 11 operatively connected to the drive shaft (not shown) of a vehicle engine and a turbine 12 of the torque converter. As is conventional, the housing 11 is connected to an impeller (not shown) for the torque converter which, with the turbine and a stator, provides a fluid coupling between the vehicle engine and an automatic transmission.

The housing 11 is provided with an annular clutching surface 13 adapted to be engaged by an annular friction ring 14 secured to an annular piston plate 15, such as shown in U.S. Pat. No. 4,441,595, having outer and inner flanges 16 and 17, respectively; the inner flange 17 being journalled for axial sliding reciprocatory movement on a bearing surface 18 of the housing or turbine. The outer flange 16 is provided with circumferentially spaced pairs of slots 19,19 separated by bars 21 for a purpose to be later described.

Figure 3:
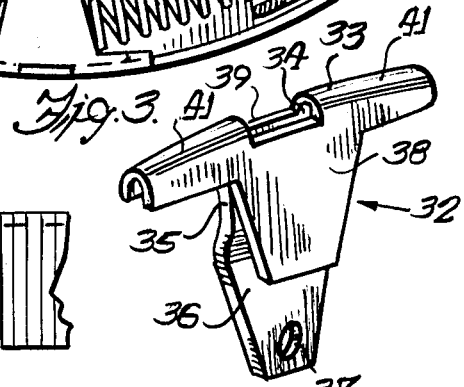
FIG. 3 is an enlarged perspective view of a torque input member for the damper assembly.

Within the piston plate is located an annular hub plate 22 having an inner periphery 23 provided with notches 24 engaging an annular notched member 25 secured to the turbine 12 to rotate therewith. On the periphery of the hub plate are positioned a plurality of circumferentially equally spaced radially outwardly extending hub arms 26, each having outwardly diverging edges 27 terminating in circumferentially oppositely extending wings 28 on an arcuate outer edge 29 closely adjacent the outer flange 16. Secured to the piston plate 15 by rivets 31 are a plurality of torque input members 32, such as shown in FIG. 3. Each member includes a generally U-shaped upper body 33 forming a channel 34 receiving the arcuate outer edge 29 of a hub arm 26, a depending mounting tab 35 having an offset lower portion 36 containing an opening 37 receiving the rivet 31, and a depending positioning tab 38. The U-shaped body 33 has a central notch 39 adapted to receive the bar 21 on the outer piston plate flange 16, with the separated body portions 41,41 generally conformably received in the pair of notches or slots 19,19 to rotate the piston plate 15.

Located between each pair of adjacent hub arms 26 is an elongated arcuate slot 42 extending over an arc of approximately 45° in the hub plate. A pair of spring separators 43,43' are mounted to move in each slot and provide a guided limited movement therefor. Each separator 43 or 43' includes a generally rectangular base 44 having a radial arm 45 extending outwardly therefrom and having a slight offset 46, the arm terminating in an arcuate outer edge 47. The sides 48 of the arm slightly diverge outwardly to terminate in circumferentially oppositely extending wings 49 forming extensions of the arcuate edge 47. The offset positions the outer arm 45 in substantially the same plane as the hub arms 26.

The base 44 of each separator has a central opening 51 receiving the reduced end 53 of a rivet 52 having an enlarged head 54 on the opposite end and a shank 55 for a bearing 56 adapted to be received within an arcuate slot 42; the head 54 being located on one side of the hub plate and the base 44 on the opposite side with the reduced end 53 of the rivet extending through the opening 51 and headed at 57 to retain the separator on the hub plate. As seen in FIG. 1, a pair of spring separators are located in each arcuate slot 42 between adjacent hub arms. Sets of compression damping springs 58, 59 and 61 are positioned between adjacent hub arms 26 with the separator arms 45 interposed between adjacent springs 58,59 and 59,61. Although shown as single compression springs, each damper spring may be a nested set of two or three concentric springs, and the springs 58, 59 and 61 may have differing spring characteristics depending on the desired damping action.

In operation, the piston plate 15 and damper assembly 10 rotate with the torque converter turbine 12 at low rotational speeds. As the engine speed rises, the rotational speed of the impeller causes increased fluid circulation to the turbine with increased fluid pressure in the converter. When the rotational speed reaches a predetermined level, the increased fluid pressure results in axial movement of the piston plate 15 to cause the friction surfaces 13 and 14 to engage, so that the housing 11 now directly drives the piston plate 15 and turbine without the inherent slippage of the fluid coupling. Rotation of the piston plate causes the torque input members 32 to act on the damper springs 58 of each spring set, which in turn react with the first spring separators 43 and cause compression of the second damper springs 59. Action of springs 59 act on the second spring separators 43', which in turn, compress the third springs 61; springs 61 acting on a hub arms 26 to rotate the hub plate 22 and turbine 12 through the notched connection between the hub plate notched periphery 23 and notched turbine member 25. As there are four hub arms, torque input members pairs of spring separators and sets of damper springs, the above described spring and spring separator damping action simultaneously occurs in each of the four spring sets.

FIGS. 7 through 12 disclose a second embodiment of vibration damper assembly 65 wherein parts identical to those of the first embodiment will have the same reference numeral with the addition of a script a. This assembly includes an annular piston plate 15a with an annular friction facing 14a adapted to engage the friction surface 13a of the housing, the piston plate being axially slidable under hydraulic pressure from within the torque converter to engage the clutch surfaces. The hub plate 22a has a notched inner periphery 23a and a plurality of circumferentially spaced radially outwardly extending hub arms 26a. The hub plate includes the inner portion 66 and hub arms 26a in a substantially common plane and an offset central portion 67 defining a plurality of bearing tabs 68 extending radially outwardly and in the same plane as the inner hub plate portion 66.

Journalled on the arcuate edges of the tabs 68 is an equalizer ring 69 generally parallel to and bearing against the offset hub plate central portion 67, the ring having a plurality of slightly offset equalizer arms 71 residing in a common plane with the hub arms. Each equalizer arm 71 has diverging edges 72, with the arm terminating in a generally T-shaped surface 73 in a plane perpendicular to the arm; the surface 73 having a pair of spaced forwardly and downwardly curved fingers 74, similar to the fingers 81 shown in FIG. 10, acting as partial housings for the damper springs. The ring also includes a plurality of forwardly offset radially extending guide tabs 75 normally in radial alignment with tabs 68 of the hub plate.

Journalled on the arcuate tabs 75 is a second equalizer ring 76 concentric with the equalizer ring 69 and having similar equalizer arms 77 with diverging edges 78 terminating in a wide T-shaped surface 79 with forwardly and downward curved spaced fingers 81 (FIG. 10). The arms 77 are slightly rearwardly offset to lie in the same plane as hub arms 26a and first equalizer arms 71. Normally axially aligned with the hub arms 26a are torque input members 82 (see FIG. 12) having a base arm portion 83 with an opening 84 to receive suitable securing means, such as rivet 85, to fix the member 82 to the piston plate 15a.

The member 82 parallels the piston plate for approximately two-thirds of its length and then is inwardly offset at 86 to form a generally inverted, U-shaped circumferentially extending top portion 87 receiving the hub arm 26a therein and having a central notch 88 and a central depending arm 89; each end of the portion 87 having a rearwardly extending lip 92 and a forwardly and downwardly curved arm 93 forming a partial housing for damper springs 58a and 61a. The outer flange 16a of the piston plate 15a has a pair of notches 94,94 (FIG. 8) separated by a central arm 95 received in the notch 88; the ends 91 of the U-shaped top portion 87 being received in the notches 94,94. This assembly operates in substantially the same manner as the assembly of FIGS. 1-6 with the equalizer rings 69 and 76 being substituted for the spring separators 43,43'.

FIGS. 13 through 15 disclose a third embodiment of vibration damper assembly 101 similar to the assembly of FIG. 1 with like components having the same reference numeral with a script b. The piston plate 15b has a suitable annular friction facing and inner and outer flanges 16b and 17b, and torque input members 82b secured to the plate. A hub plate 22b having a notched inner periphery 23b is positioned within the piston plate and has radial hub arms received within the U-shaped body 87b of each input member 82b. The upper body 87b of each input member 32b has a peripheral notch 88b cooperating with a bar 21b formed in the outer flange 16b of the piston plate.

Located between hub arms in the hub plate is an elongated arcuate slot 42b. A pair of spring separators 102,102', each have a relatively wide rectangular base 103 with a pair of spaced openings 104,104, a radial arm 105 having an offset 106 and terminating in an arcuate rearwardly extending flange 107. On each side of the arm 105, the flange extends forwardly in a pair of downwardly curved spaced arms 108. A pair of rivets 109,109 are received in the openings 104,104 and have enlarged heads 111,111 and shanks 112,112 for bearings 113,113 received in the slot 42b. This assembly also includes damper springs 58b,59b and 61b, and operates in substantially the same manner as the embodiment of FIG. 1.

I claim:

1. A vibration damper assembly to transmit torque between driving and driven members, comprising a piston plate adapted to engage torque input means and having an outer flange, a hub plate operatively connected to torque output means and having a plurality of circumferentially spaced, radially extending integral hub arms, a plurality of torque input members corresponding in number to and generally axially aligned with said hub arms secured to said piston plate, each torque input member including a pair of generally parallel arms joined by a U-shaped base forming a channel to receive a hub arm therein, said U-shaped base having a central notch defining separated body portions and said piston plate outer flange having a pair of spaced notches receiving the separated body portions of the base and a central tab received in said central notch, a plurality of damper spring sets interposed between adjacent torque input members, and spring separators interposed between adjacent damper springs in a spring set and guided on said hub plate for arcuate movement relative to said hub plate and piston plate.

2. A vibration damper assembly as set forth in claim 1, in which one arm depends beyond the opposite parallel arm and is secured to the piston plate.

3. A vibration damper assembly as set forth in claim 2, wherein each U-shaped base portion includes a rearwardly curved lip and a pair of laterally spaced forwardly and downwardly curved fingers.

4. A vibration damper assembly as set forth in claim 1, in which said U-shaped base extends circumferentially beyond the edges of the arms.

5. A vibration damper assembly as set forth in claim 1, in which said spring separators each includes a base portion having a radial arm extending between and in the path of the damper springs, at least one bearing carried by said base portion, and an arcuate slot formed in said hub plate receiving the bearings of a pair of spring separators.

6. A vibration damper assembly as set forth in claim 5, wherein said spring separator arms have a central slight offset so that the outer end of each arm is in the same plane as the hub arms, each spring separator arm having diverging edges and terminating in a curved edge with circumferentially oppositely extending fingers.

7. A vibration damper assembly as set forth in claim 5, wherein each spring separator has a single bearing received in the hub plate slot.

8. A vibration damper assembly as set forth in claim 5, wherein each spring separator base portion carries a pair of bearings received in a hub plate slot, and each arm includes a central slight offset so that the outer end thereof is in the same plane as the hub arms and terminates in a rearwardly extending flange and a pair of laterally spaced forwardly and downwardly curved flanges.

9. A vibration damper assembly as set forth in claim 8, in which each said torque input member includes a rearwardly extending lip opposite to a pair of laterally spaced forwardly and downwardly curved fingers acting to partially enclose said damper springs.

10. A vibration damper assembly to transmit torque between driving and driven members, comprising a piston plate adapted to engage torque input means, a hub plate operatively connected to torque output means and having a plurality of circumferentially spaced, radially extending integral hub arms, a plurality of torque input members corresponding in number to and generally axially aligned with said hub arms secured to said piston plate, each torque input member including a pair of generally parallel arms joined by a U-shaped base forming a channel to receive a hub arm therein, a plurality of damper spring sets interposed between adjacent torque input members, and spring separators interposed between adjacent damper springs in a spring set and guided on said hub plate for arcuate movement relative to said hub plate and piston plate, said hub plate including a plurality of slightly offset guide tabs on the periphery thereof, and said spring separators including a pair of substantially concentric rings, each ring having a plurality of circumferentially spaced radial arms located in the path of the damper springs.

11. A vibration damper assembly as set forth in claim 10, wherein said first ring is guided on said guide tabs of said hub plate, and said spring separator arms are slightly offset to lie in the same plane as said hub arms.

12. A vibration damper assembly as set forth in claim 11, in which said first ring includes a plurality of offset guide tabs on its outer periphery, and said second ring rides on the guide tabs of said first ring.

13. A vibration damper assembly as set forth in claim 12, wherein a spring separator arm of each guide ring is positioned between adjacent hub arms.

* * * * *